(12) United States Patent
Ueda et al.

(10) Patent No.: US 11,530,120 B2
(45) Date of Patent: Dec. 20, 2022

(54) TRANSPORT VEHICLE AND TRANSPORT FACILITY

(71) Applicant: Daifuku Co., Ltd., Osaka (JP)

(72) Inventors: Yuichi Ueda, Hinocho (JP); Masashige Iwata, Hinocho (JP); Akira Emoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 268 days.

(21) Appl. No.: 16/632,224

(22) PCT Filed: Jul. 13, 2018

(86) PCT No.: PCT/JP2018/026508
§ 371 (c)(1),
(2) Date: Jan. 17, 2020

(87) PCT Pub. No.: WO2019/017292
PCT Pub. Date: Jan. 24, 2019

(65) Prior Publication Data
US 2020/0231420 A1   Jul. 23, 2020

(30) Foreign Application Priority Data
Jul. 20, 2017  (JP) .............................. JP2017-140911

(51) Int. Cl.
*B66F 9/07* (2006.01)
*B65G 1/04* (2006.01)
(Continued)

(52) U.S. Cl.
CPC .............. *B66F 9/07* (2013.01); *B65G 1/0414* (2013.01); *B65G 47/901* (2013.01); *B65G 61/00* (2013.01);
(Continued)

(58) Field of Classification Search
CPC .... B65G 61/00; B65G 1/0414; B65G 1/0435; B66F 9/07
See application file for complete search history.

(56) References Cited

U.S. PATENT DOCUMENTS 4,492,504 A * 1/1985 Hainsworth .............. B66F 9/07
414/273
4,678,390 A * 7/1987 Bonneton ............ B65G 1/1375
294/4

(Continued)

FOREIGN PATENT DOCUMENTS

EP      0169156 A1   1/1986
JP      612603 A     1/1986
(Continued)

*Primary Examiner* — Kaitlin S Joerger
(74) *Attorney, Agent, or Firm* — The Webb Law Firm

(57) ABSTRACT

A transport vehicle (2) that travels along a container shelf (1) is provided with a plurality of levels of shelf portions (11) arranged in a vertical direction (Z) and configured to support containers (W), thereby transporting the containers (W). The transport vehicle (2) is provided with a support region where a container (W) is supported, a first transfer apparatus (23) that inserts/takes the container (W) into/out of the container shelf (1), and a second transfer apparatus (24) that loads/unloads the container (W) on/from the support region. The second transfer apparatus (24) is configured such that a container (W) can be moved to the support region so as to allow a plurality of the containers (W) to be supported in a stacked state in the support region.

18 Claims, 10 Drawing Sheets

(51) Int. Cl.
*B65G 47/90* (2006.01)
*B65G 61/00* (2006.01)
*B66F 9/06* (2006.01)
*G05D 1/02* (2020.01)

(52) U.S. Cl.
CPC .......... B66F 9/063 (2013.01); G05D 1/0212 (2013.01); *G05D 2201/0216* (2013.01)

(56) References Cited

U.S. PATENT DOCUMENTS

| | | | | |
|---|---|---|---|---|
| 5,211,523 | A | * | 5/1993 | Andrada Galan ...... B60L 50/52 414/282 |
| 10,046,912 | B2 | * | 8/2018 | Behling ............... B66F 9/07513 |
| 10,076,815 | B2 | * | 9/2018 | Sasamoto ............ B23Q 7/1494 |
| 10,962,963 | B2 | * | 3/2021 | Zanger ................ B25J 9/1612 |
| 2009/0136331 | A1 | * | 5/2009 | Muser ...................... B66F 9/07 414/529 |
| 2017/0121109 | A1 | | 5/2017 | Behling |
| 2018/0305124 | A1 | * | 10/2018 | Guo ...................... B25J 19/002 |
| 2020/0165082 | A1 | * | 5/2020 | Ueda ..................... B65G 65/005 |
| 2020/0207546 | A1 | * | 7/2020 | Borders ............... B65G 1/1375 |
| 2020/0231420 | A1 | * | 7/2020 | Ueda ..................... B65G 47/901 |

FOREIGN PATENT DOCUMENTS

| | | |
|---|---|---|
| JP | 428700 A | 1/1992 |
| JP | 455204 A | 2/1992 |
| JP | 8133416 A | 5/1996 |
| JP | 8244973 A | 9/1996 |
| JP | 200418183 A | 1/2004 |
| JP | 2004277062 A | 10/2004 |
| JP | 2006341968 A | 12/2006 |
| TW | 200728177 A | 8/2007 |

* cited by examiner

TRANSPORT VEHICLE AND TRANSPORT FACILITY

CROSS-REFERENCE TO RELATED APPLICATIONS

This application is the United States national phase of International Application No. PCT/JP2018/026508 filed Jul. 13, 2018, and claims priority to Japanese Patent Application No. 2017-140911 filed Jul. 20, 2017, the disclosures of which are hereby incorporated by reference in their entirety.

BACKGROUND OF THE INVENTION

Field of the Invention

The present invention relates to a transport vehicle that travels along a front face of a container shelf provided with a plurality of levels of shelf portions arranged in the vertical direction and configured to support containers, thereby transporting the containers, and also relates to a transport facility provided with a plurality of such transport vehicles.

Description of Related Art

An example of the above sort of transport facility is described in JP 2004-277062A (Patent Document 1). A transport vehicle provided in the transport facility of Patent Document 1 is provided with a transfer robot 6 that inserts/takes a container into/out of a container shelf. When performing container transport, the transport vehicle uses the transfer robot 6 to remove the container from the container shelf while the transport vehicle is in a state stopped in front of the container shelf, and travels to the front of another container shelf in a state where the transfer robot 6 is supporting the container, and then stores the container being supported by the transfer robot 6 on that other container shelf.

SUMMARY OF THE INVENTION

When performing container transport, the above-described transport vehicle travels in a state where the transfer robot 6 is supporting a container that was removed from a container shelf, so only one container can be transported at a time. Therefore, it is not possible to efficiently transport containers to container shelves using this transport vehicle, or to efficiently transport containers from container shelves using this transport vehicle.

Consequently, realization of a transport vehicle that can efficiently transport containers, and a transport facility provided with a plurality of such transport vehicles, is desired.

A transport vehicle according to the present disclosure travels along a front face of a container shelf provided with a plurality of levels of shelf portions arranged in a vertical direction and configured to support containers, thereby transporting the containers.

The containers are configured to be stackable in the vertical direction. The transport vehicle is provided with a support region where the container is supported, a first transfer apparatus that inserts/takes the container into/out of the container shelf, and a second transfer apparatus that loads/unloads the container on/from the support region. The second transfer apparatus is configured such that a container can be moved to the support region so as to allow a plurality of the containers to be supported in a stacked state in the support region.

According to this configuration, a container that was removed from the container shelf by the first transfer apparatus can be moved to the support region by the second transfer apparatus. Also, a container that was moved from the support region by the second transfer apparatus can be stored on the container shelf by the first transfer apparatus. Also, because the containers are configured to be supported in a stacked state in the support region where the second transfer apparatus loads/unloads the containers, a plurality of the containers can be collectively transported by the transport vehicle. Therefore, it is possible to efficiently transport the containers to the container shelf using this transport vehicle, and to efficiently transport the containers from the container shelf using this transport vehicle.

DESCRIPTION OF THE INVENTION

1. First Embodiment

A first embodiment of a transport facility provided with a plurality of transport vehicles will be described with reference to the drawings.

Figure 1:
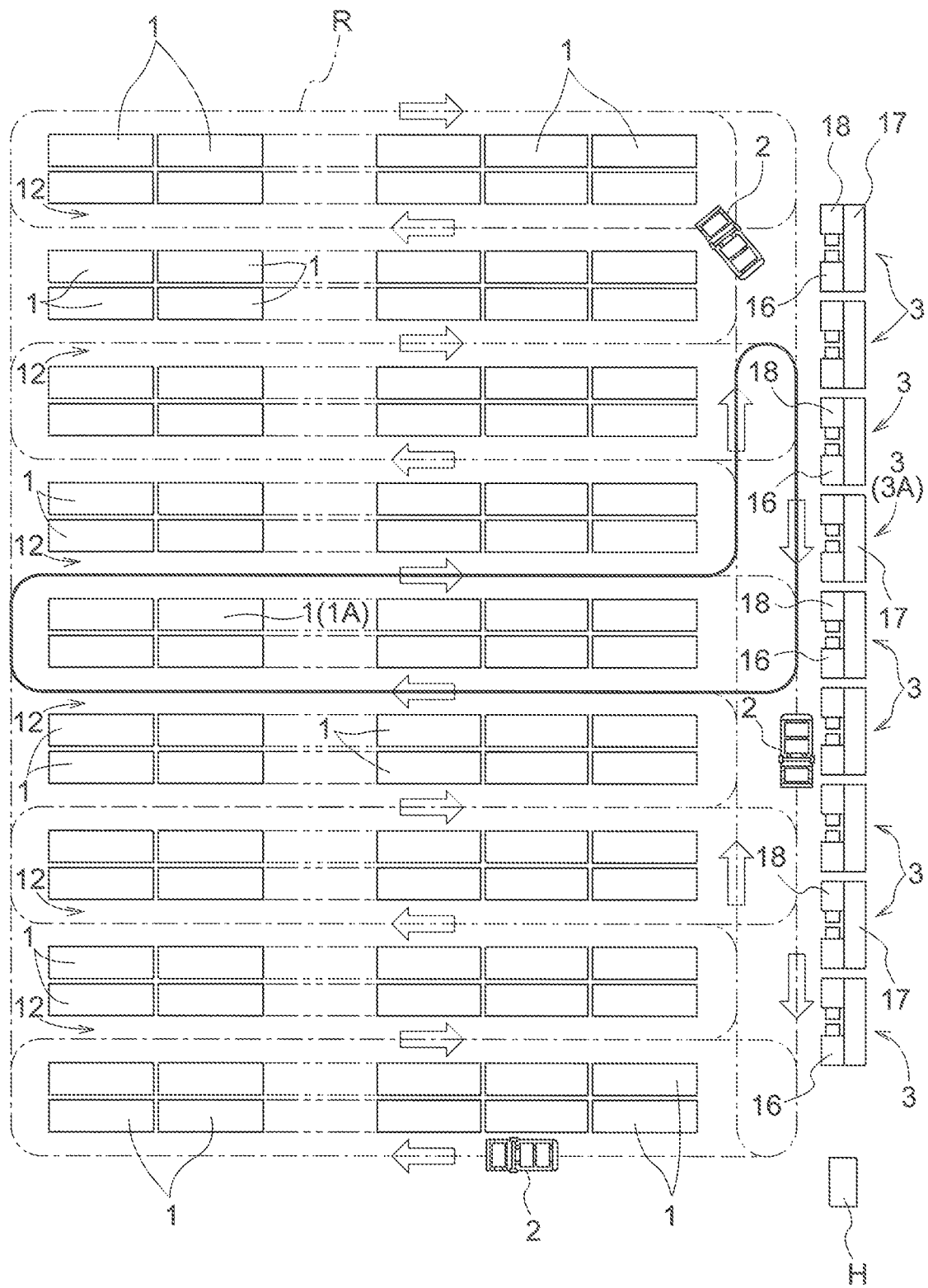
FIG. 1 is a plan view of a transport facility in a first embodiment.

As shown in FIG. 1, the transport facility includes a plurality of container shelves 1 that accommodate containers W, a plurality of transport vehicles 2 that transport the containers W, a plurality of picking units 3 where a worker performs picking work, and a control apparatus H that controls the plurality of transport vehicles 2.

Figure 2:
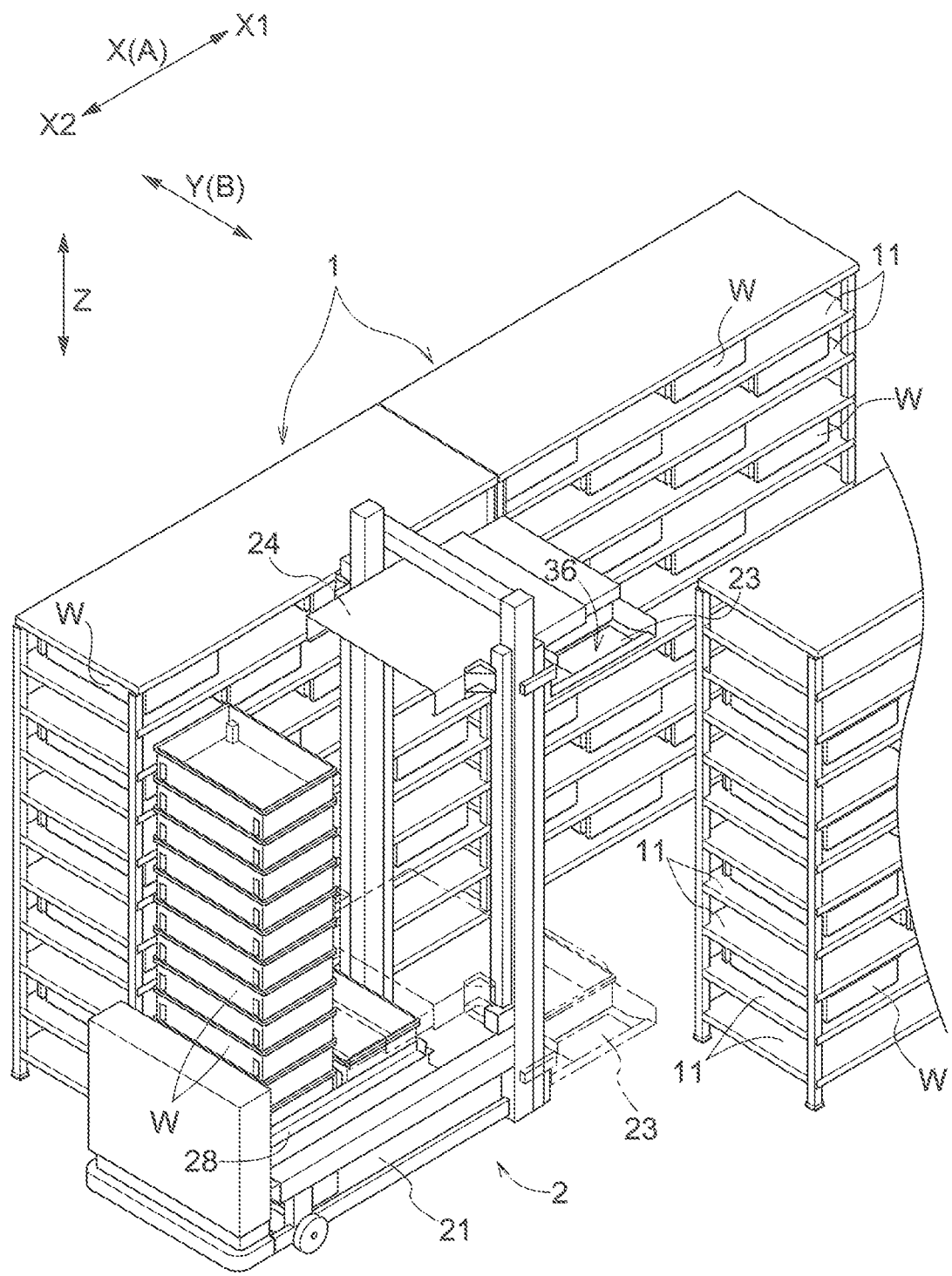
FIG. 2 is a perspective view of a transport vehicle and container shelves in the first embodiment.
Figure 5:
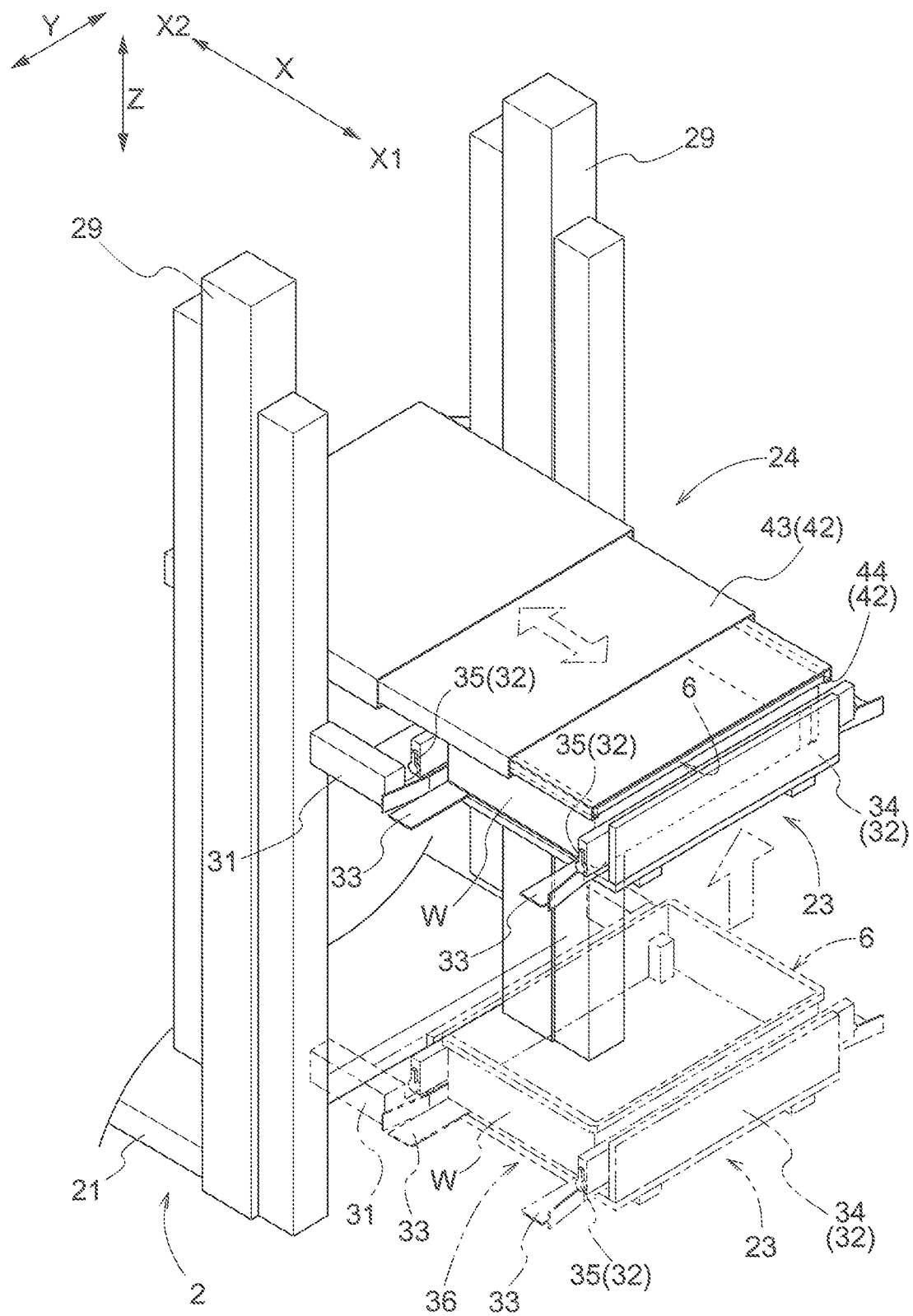
FIG. 5 is a perspective view of a first transfer apparatus and a second transfer apparatus in the first embodiment.

As shown in FIGS. 2 and 5, each container W is formed by erecting side wall portions at the periphery of a bottom portion, and is formed in a box shape with an open upper face. A flange portion 6 that protrudes outward is provided at the upper end of the container W (the upper end of the side wall portion).

The upper end portion of the container W and the lower end portion of another container W are configured to be capable of fitting together in a vertical direction Z, and the containers W are configured to be capable of stacking. Incidentally, the containers W are configured such that when the containers W are stacked, an accommodating space is formed between the bottom portion of one container W and the bottom portion of another container W that has been stacked above that one container W, and a container W can be stacked in a state where an article has been accommodated in the container W.

As shown in FIG. 2, the container shelf 1 is provided with a plurality of levels of shelf portions 11 arranged in the vertical direction Z and configured to support the containers W. A plurality of the containers W that are not stacked can be supported on the shelf portions 11 in a state lined up in a shelf width direction A of the container shelf 1.

As shown in FIG. 1, a plurality of the container shelves 1 are installed in an attitude following along the shelf width direction A (see FIG. 2). Two of the container shelves 1 whose front faces oppose each other are installed in a state spaced apart from each other in a shelf depth direction B (see FIG. 2). An inter-shelf passageway 12 is formed between these two container shelves 1, and the inter-shelf passageway 12 is used as a passageway through which the transport vehicles 2 travel. The plurality of container shelves 1 in an attitude following along the shelf width direction A are lined up in the shelf depth direction B, and the plurality of container shelves 1 are disposed such that a plurality of the inter-shelf passages 12 are formed. When a transport vehicle 2 travels through an inter-shelf passageway 12, the transport vehicle 2 travels along the front face of the container shelves 1. Incidentally, an inter-shelf passageway 12 is not formed between two container shelves 1 whose rear faces are facing each other.

A direction following along the longitudinal direction of the container shelves 1 is referred to as the shelf width direction A, and a direction perpendicular to the shelf width direction A as viewed from the vertical direction Z is referred to as the shelf depth direction B. Also, a face of the container shelf 1 that faces the inter-shelf passageway 12 is referred to as a front face, and a face on the opposite side as the face of the container shelf 1 that faces the inter-shelf passageway 12 is referred to as a rear face.

The shelf portion 11 is provided with a first restriction body 13 and a second restriction body 14. The first restriction body 13 is provided so as to be positioned on both sides in the shelf depth direction B with respect to the container W supported by the shelf portion 11, and the second restriction body 14 is provided so as to be positioned on both sides in the shelf width direction A with respect to the container W supported by the shelf portion 11. The container W supported by the shelf portion 11 is restricted from moving in the shelf depth direction B by the first restriction body 13, and is restricted from moving in the shelf width direction A by the second restriction body 14.

The picking unit 3 is provided with a receiving unit 16, a picking work unit 17, and a discharging unit 18. In the picking unit 3, when the receiving unit 16 receives a container W from a transport vehicle 2, that container W is transported to the picking work unit 17. In the picking work unit 17, picking work to remove a necessary article from the container W is performed, and then the container W for which the picking work has been completed is transported from the picking work unit 17 to the discharging unit 18, and that container W is discharged from the discharging unit 18 to the transport vehicle 2. In this way, the picking unit 3 is configured to be capable of transporting a container W that has been received by the receiving unit 16 to the discharging unit 18 through the picking work unit 17.

Figure 3:
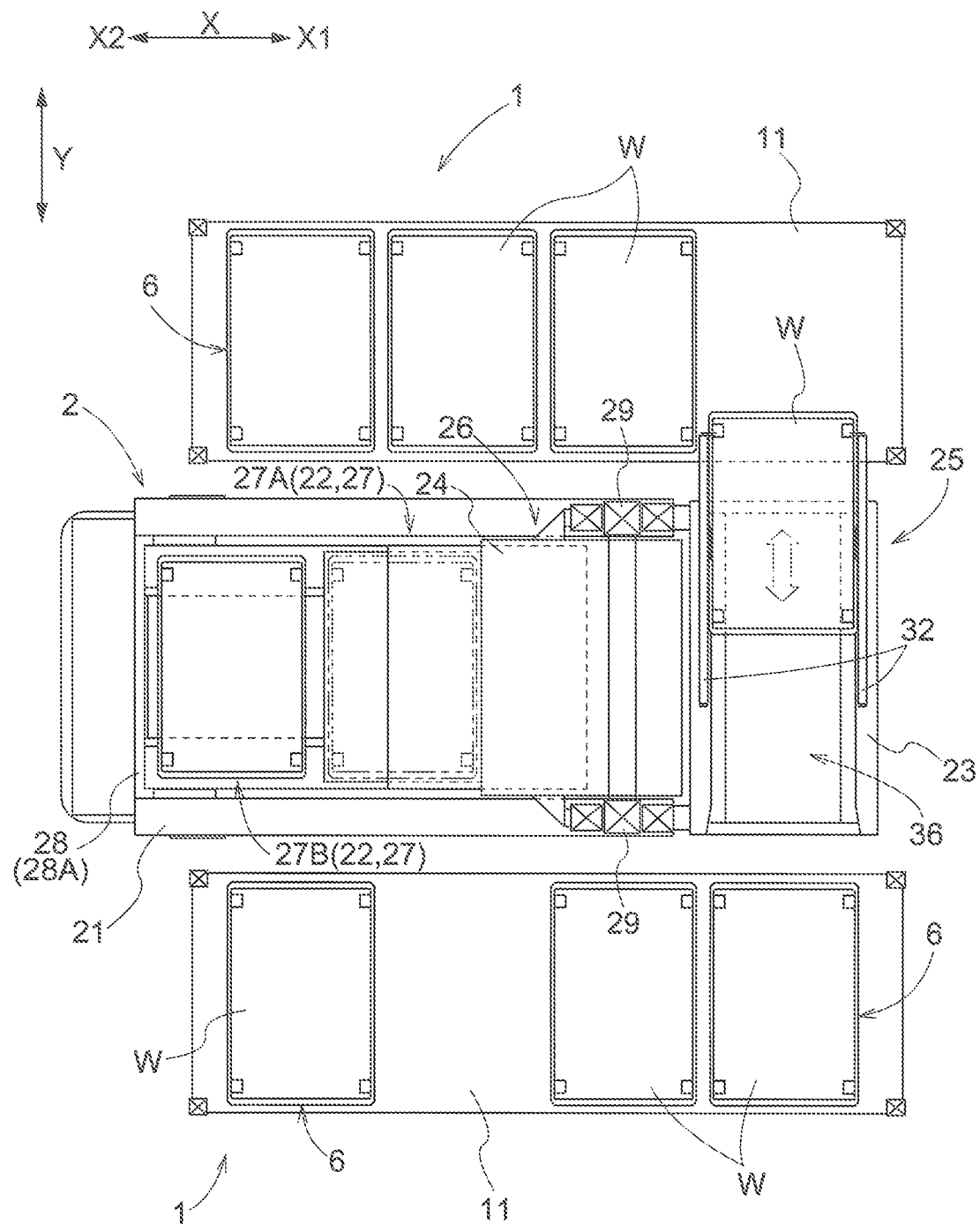
FIG. 3 is a plan view of the transport vehicle and the container shelves in the first embodiment.
Figure 4:
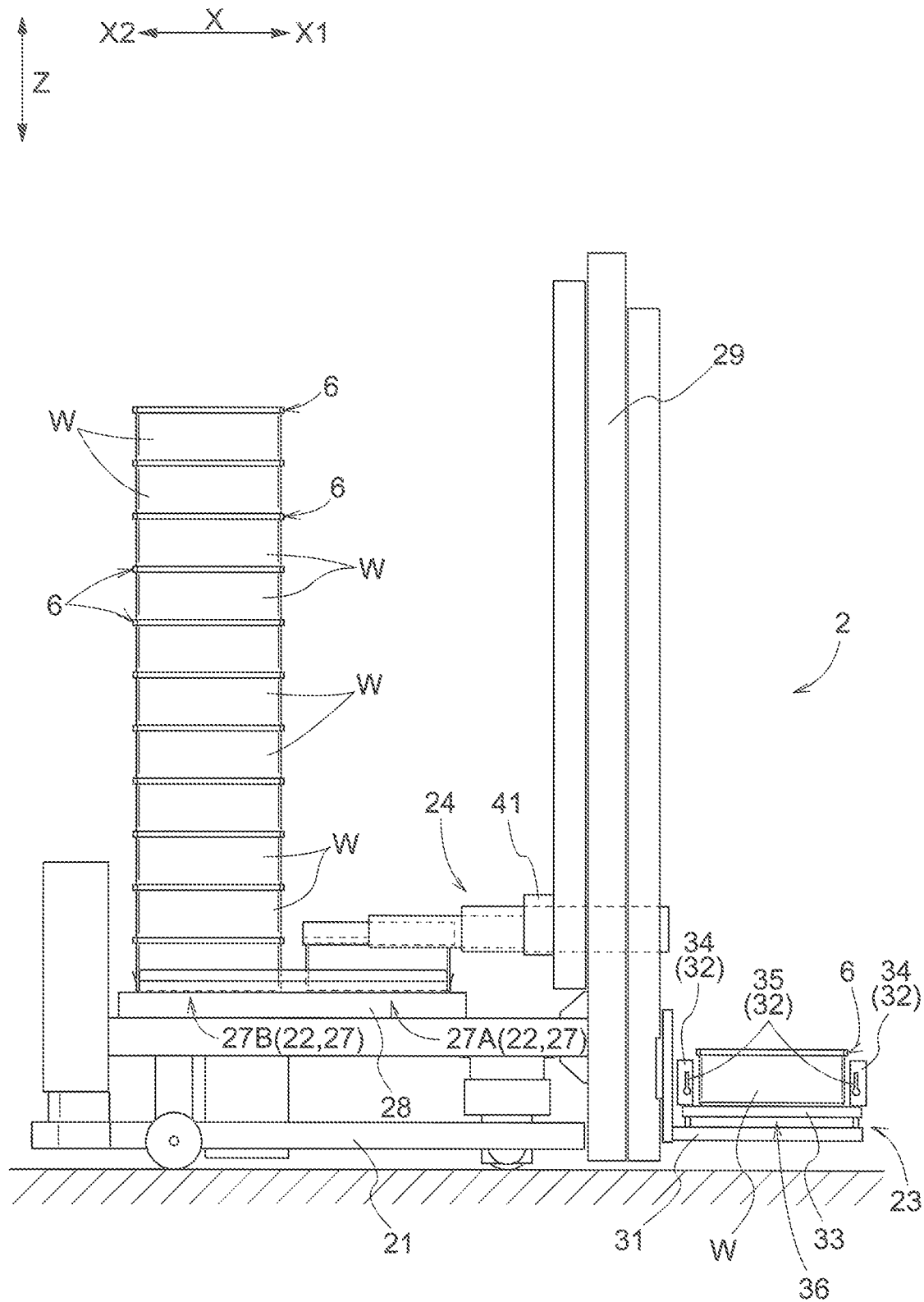
FIG. 4 is a side view of the transport vehicle in the first embodiment.

As shown in FIGS. 2 to 4, the transport vehicle 2 is provided with a traveling unit 21 that travels on the floor, a container support portion 28 configured to support the containers W in a support region 22, a first transfer apparatus 23 that inserts/takes the containers W into/out of the container shelves 1, and a second transfer apparatus 24 that loads/unloads the containers W on/from the support region 22. In the following description of the transport vehicle 2, in a state where the transport vehicle 2 is positioned in the inter-shelf passageway 12, the direction following along the shelf width direction A is referred to as a front-rear direction X, and the direction following along the shelf depth direction B and perpendicular to the front-rear direction X when viewed from the vertical direction Z is referred to as a left-right direction Y.

The transport vehicle 2 performs carry-out transport and carry-in transport. In the carry-out transport, the transport vehicle 2 transports a container W (a carry-out container W2) from the container shelf 1 to the receiving unit 16 of the picking unit 3. In the carry-in transport, the transport vehicle 2 transports a container W (a carry-in container W1) from the discharging unit 18 of the picking unit 3 to the container shelf 1. Note that a container W to be accommodated on the container shelf 1 is referred to as the carry-in container W1, and a container W that was removed from the container shelf 1 is referred to as the carry-out container W2. In the present embodiment, the support region 22 supports only one of the carry-in container W1 and the carry-out container W2. When supporting only the carry-in container W1 in the support region 22, the transport vehicle 2 executes only the carry-in transport among the carry-in transport and the carry-out transport, and when supporting only the carry-out container W2 in the support region 22, the transport vehicle 2 executes only the carry-out transport among the carry-in transport and the carry-out transport.

As shown in FIG. 3, the support region 22 is provided at a position adjacent to an installation region 26 of the second transfer apparatus 24 in the horizontal direction. An installation region 25 of the first transfer apparatus 23 is provided at a position adjacent to the installation region 26 of the second transfer apparatus 24 in the horizontal direction. More specifically, the support region 22 is positioned in a state adjacent in a front-rear second direction X2, which is one direction in the front-rear direction X, with respect to the installation region 26 of the second transfer apparatus 24. Also, the installation region 25 of the first transfer apparatus 23 is positioned in a state adjacent in a front-rear first direction X1, which is the other direction in the front-rear direction X, with respect to the installation region 26 of the second transfer apparatus 24.

The support region 22 has a plurality of stacking regions 27 capable of supporting a plurality of the containers W in a stacked state. More specifically, the plurality of stacking regions 27 included in the support region 22 include a first region 27A where a container W can be directly moved by the second transfer apparatus 24, and a second region 27B where a container W cannot be directly moved by the second transfer apparatus 24. The first region 27A and the second region 27B are arranged in a state adjacent to each other in the front-rear direction X, and the first region 27A is positioned in the front-rear first direction X1 with respect to the second region 27B.

Also, the container support portion 28 is configured with a transport apparatus 28A that transports the containers W positioned in the support region 22 in the front-rear direction X. In this way, the transport apparatus 28A is provided in the support region 22, and the transport apparatus 28A transports a plurality of the containers W in a stacked state between the first region 27A and the second region 27B. Therefore, for example, in a case where there are no longer any of the containers W in the first region 27A because the stacked containers W positioned in the first region 27A were moved one by one by the second transfer apparatus 24, it is possible to move the stacked containers W positioned in the second region 27B to the first region 27A using the transport apparatus 28A. Also, for example, in a case where the containers W are stacked up in the first region 27A by the second transfer apparatus 24 and a prescribed number of the containers W have been stacked, it is possible to move those stacked containers W positioned in the first region 27A to the second region 27B using the transport apparatus 28A.

As shown in FIGS. 4 and 5, the first transfer apparatus 23 is provided with a first raising/lowering unit 31 capable of being raised/lowered along a mast 29 erected in the traveling unit 21, a first transfer unit 32 supported by the first raising/lowering unit 31, and a first support portion 33 configured to support the bottom face of a container W from below. The first transfer unit 32 is provided with a first fork portion 34 that can be extended/withdrawn in the left-right direction Y, and a hook portion 35 that is supported by a tip fork of the first fork portion 34 and moves together with the tip fork. The first fork portion 34 is configured to be switchable between a withdrawn state in which the tip fork is withdrawn toward the side of the first raising/lowering unit 31 (see FIG. 5), and a protruding state in which the tip fork is caused to protrude in the left-right direction Y from the withdrawn state. Also, the hook portion 35 is configured to be movable between a protruding position in which the hook portion 35 is caused to protrude to the side of the first support portion 33 and overlaps the container W on the first support portion 33 when viewed from the left-right direction Y, and a withdrawn position in which the hook portion 35 does not overlap the container W on the first support portion 33 when viewed from the left-right direction Y.

Note that the installation region 25 of the first transfer apparatus 23 is a region where the first transfer apparatus 23 exists when viewed from the vertical direction Z in a state where the tip fork has been positioned at the withdrawn position.

The first transfer apparatus 23 moves the first raising/lowering unit 31 in the vertical direction Z to move the container W supported on the first support portion 33 together with the first support portion 33 in the vertical direction Z. Also, by extending/withdrawing the first fork portion 34 in a state where the first support portion 33 is positioned at a transfer height corresponding to the shelf portion 11 and the hook portion 35 is caused to protrude to the protruding position, the container W is moved in the left-right direction Y by the hook portion 35, and thus the container W is moved between the first support portion 33 and the shelf portion 11.

In this way, the first transfer apparatus 23 is provided with the first support portion 33 (corresponding to a support portion) configured to support the container W and is capable of raising/lowering the first support portion 33, and is configured to, in a state where the first support portion 33 has been raised/lowered to a transfer height corresponding to a shelf portion 11 to receive the transfer, insert/take the container W into/out of that shelf portion 11.

Also, the first transfer apparatus 23 moves the container W between the first support portion 33 and the receiving unit 16, and between the first support portion 33 and the discharging unit 18, similar to movement of the container W between the first support portion 33 and the shelf portion 11.

As shown in FIG. 4, the first raising/lowering unit 31 is configured to be capable of being raised/lowered, from a position where the container W on the first support portion 33 is positioned lower than a lowermost container W on the container support portion 28, to a position where the container W on the first support portion 33 is positioned higher than an uppermost container W when a prescribed number of the containers W have been stacked on the container support portion 28. Also, the transfer height corresponding to the lowermost shelf portion 11 is set to the height where the container W is supported by the first support portion 33, at a position lower than the container W arranged lowermost in the support region 22.

As shown in FIGS. 4 and 5, the second transfer apparatus 24 is provided with a second raising/lowering unit 41 capable of being raised/lowered along the mast 29, and a second transfer unit 42 supported by the second raising/lowering unit 41. The second transfer unit 42 is provided with a second fork portion 43 that can be extended/withdrawn in the front-rear direction X, and a second holding portion 44 that is provided in a tip fork of the second fork portion 43 and moves together with the tip fork. The second fork portion 43 is configured to be switchable between a withdrawn state withdrawn toward the side of the second raising/lowering unit 41, a first protruding state in which the second fork portion 43 is caused to protrude in a front-rear first direction X1 of the front-rear direction X from the withdrawn state (see FIG. 5), and a second protruding state in which the second fork portion 43 is caused to protrude in a front-rear second direction X2 of the front-rear direction X from the withdrawn state (see FIG. 4).

Note that the installation region 26 of the second transfer apparatus 24 is a region where the second transfer apparatus 24 exists when viewed from the vertical direction Z in a state where the second fork portion 43 is in the withdrawn state.

In the second transfer apparatus 24, when the second fork portion 43 is in the first protruding state, the container W held by the second holding portion 44 is positioned directly above a relay region 36, and when the second fork portion 43 is in the second protruding state, the container W held by the second holding portion 44 is positioned directly above the first region 27A in the support region 22.

The container W is moved between the first region 27A and the first support portion 33 by the movement of the second raising/lowering unit 41 in the vertical direction Z and extension/withdrawal of the second fork portion 43. Specifically, first, the second raising/lowering unit 41 is moved in the vertical direction Z such that the second holding portion 44 is higher than the first support portion 33 and lower than the flange portion 6 of the container W supported by the first support portion 33, and then the second fork portion 43 is caused to protrude to the first protruding position, and then the second raising/lowering unit 41 is raised and the flange portion 6 of the container W is held by the second holding portion 44. Next, the second raising/lowering unit 41 is moved in the vertical direction Z such that the lower end of the container W supported by the second holding portion 44 is higher than the upper end of the containers W stacked in the first region 27A (the upper face that supports the containers W of the container support portion 28 when a container W does not exist in the first region 27A), then the second fork portion 43 is caused to protrude to the second protruding position, and then the second raising/lowering unit 41 is lowered, and the container W supported by the second holding portion 44 is moved to the support region 22.

In this way, the second transfer apparatus 24 is provided with the second holding portion 44 that holds a container W from above, and the second fork portion 43 that horizontally moves the second holding portion 44 between an area above the first transfer apparatus 23 and an area above the support region 22. Also, because a container W that was moved to the area above the support region 22 by the second fork portion 43 is stacked on the top side of a container W that is already supported in the support region 22, a plurality of the containers W are supported in a stacked state in the support region 22.

Also, the second transfer apparatus 24 is configured such that, when a container W is held by the second holding portion 44, the second holding portion 44 is horizontally moved to the side near that container W by the second fork portion 43, and when holding of a container W by the second holding portion 44 is released, the second holding portion 44 is horizontally moved to the side away from that container W by the second fork portion 43.

The second transfer apparatus 24 is configured to be capable of moving a container W to the support region 22 such that a plurality of the containers W are supported in a stacked state in the support region 22.

Note that the second fork portion 43 corresponds to a horizontal movement mechanism, and the second holding portion 44 corresponds to a holding portion.

Also, the transport vehicle 2 uses the first transfer apparatus 23 to move the container W from the shelf portion 11, the receiving unit 16, or the discharging unit 18 to the relay region 36 of the first support portion 33, and uses the second transfer apparatus 24 to move the container W from the relay region 36 of the first support portion 33 to the first region 27A of the stacking region 27. Also, the transport vehicle 2 uses the second transfer apparatus 24 to move the container W from the first region 27A of the stacking region 27 to the relay region 36 of the first support portion 33, and uses the first transfer apparatus 23 to move the container W from the relay region 36 of the first support portion 33 to the shelf portion 11, the receiving unit 16, or the discharging unit 18. As described above, the transport vehicle 2 is provided with, in addition to the support region 22, the relay region 36 configured to support the container W. Also, the first transfer apparatus 23 moves the container W between the container shelf 1 and the relay region 36 (the first support portion 33), and the second transfer apparatus 24 moves the container W between the relay region 36 (the first support portion 33) and the support region 22. Note that the second holding portion 44 corresponds to a holding portion configured to hold the container W from above. Also, the second fork portion 43 corresponds to a horizontal movement mechanism that moves the holding portion in the horizontal direction between the area above the first transfer apparatus 23 and the area above the support region 22.

As shown in FIG. 1, the control apparatus H sets a travel route R of a plurality of the transport vehicles 2 and controls the transport vehicles 2 such that the plurality of transport vehicles 2 travel along the travel route R. The travel route R has a route that follows along the shelf width direction A and a route along the shelf depth direction B, and the control apparatus H controls the transport vehicles 2 to travel along the travel route R in one direction. Therefore, in the inter-shelf passageway 12 formed between two of the container shelves 1, the traveling direction of the transport vehicles 2 is one direction. Also, for example, when transporting the containers W between a target picking unit 3A that is one of the plurality of picking units 3, and a target container shelf 1A that is one of the plurality of container shelves 1, the control apparatus H controls the transport vehicles 2 to travel along the travel route R indicated by the thick solid line in FIG. 1.

Note that, in FIG. 1, the travel route R of the transport vehicles 2 is indicated by dashed-dotted lines and the thick solid line. Also, in FIG. 1, the traveling direction of the transport vehicles 2 is indicated by arrows.

2. Second Embodiment

Next, a second embodiment of the transport vehicle 2 will be described with reference to FIG. 6. In the present embodiment, the configuration of the transport vehicle 2 is different than the configuration in the first embodiment. Below, the transport vehicle 2 according to the present embodiment will be described with a focus on differences from the first embodiment. Note that points not particularly described here are the same as in the first embodiment.

Figure 6:
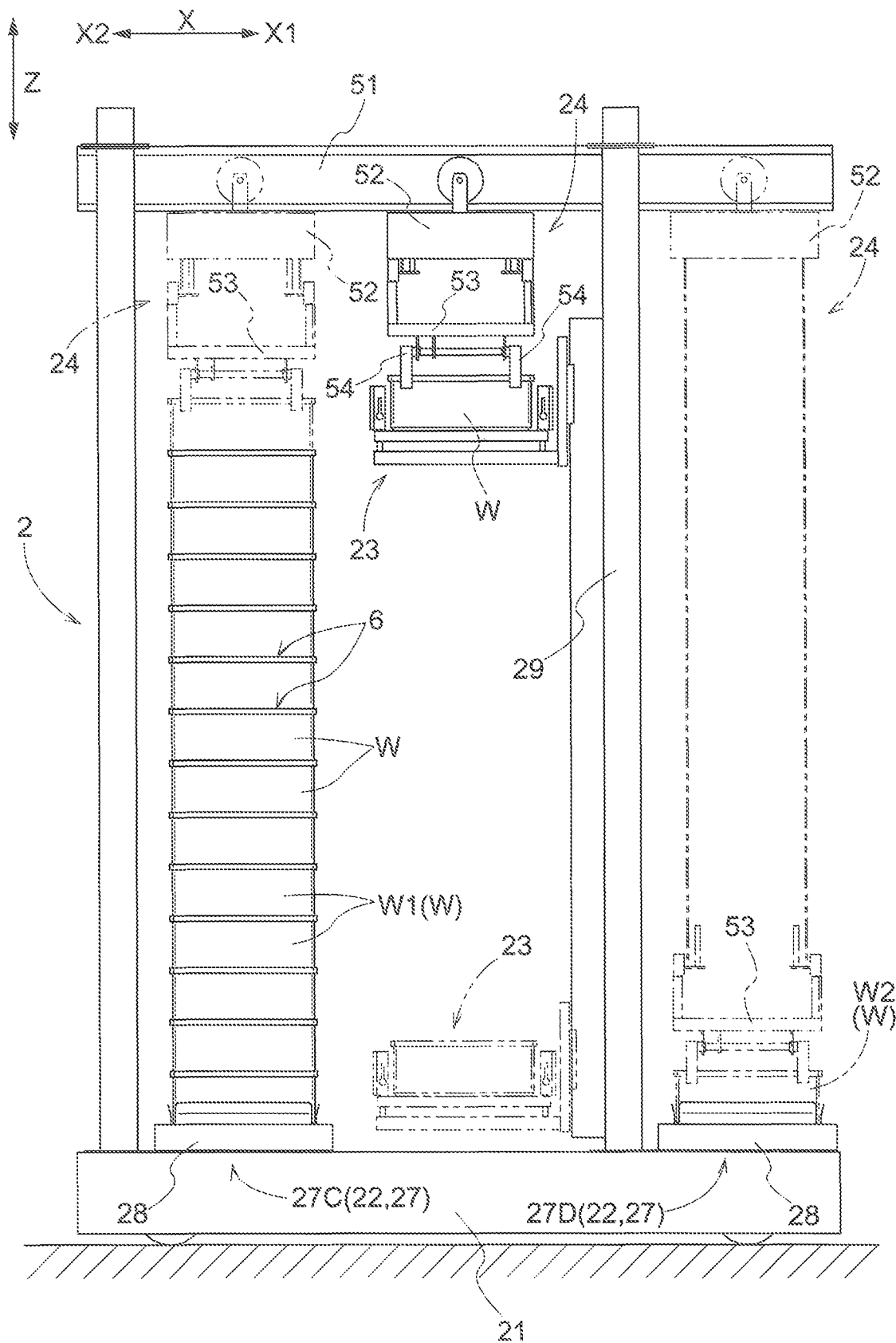
FIG. 6 is a side view of a transport vehicle in a second embodiment.

As shown in FIG. 6, the support region 22 is provided at a position adjacent to the installation region 25 of the first transfer apparatus 23 in the horizontal direction. More specifically, the support region 22 has a plurality of the stacking regions 27 where a plurality of the containers W in a stacked state can be supported. Specifically, the plurality of stacking regions 27 included in the support region 22 include a carry-in region 27C where a container W (a carry-in container W1) planned to be stored on a container shelf 1 can be supported, and a carry-out region 27D where a container W (a carry-out container W2) that was removed from a container shelf 1 can be supported. Also, the carry-out region 27D is positioned in a state adjacent to the installation region 25 of the first transfer apparatus 23 in the front-rear first direction X1. Also, the carry-in region 27C is positioned in a state adjacent to the installation region 25 of the first transfer apparatus 23 in the front-rear second direction X2.

As described above, in the present embodiment, both the carry-in container W1 and the carry-out container W2 are supported in the support region 22. Therefore, the transport vehicle 2 can execute both carry-in transport and carry-out transport in parallel. That is, this transport vehicle 2 can perform both carry-in transport and carry-out transport in parallel in one instance of back-and-forth movement between the picking unit 3 and the container shelf 1 (see FIG. 1).

As shown in FIG. 6, the second transfer apparatus 24 is provided with a moving portion 52 that is movable in the front-rear direction X along a movement rail 51, and a third holding portion 53 that is suspended from and supported by the moving portion 52. The third holding portion 53 is provided with a holding fixture 54 whose position can be changed between a holding position where the container W is held and a release position where holding of the container W is released, and a drive unit (not shown) that changes the position of the holding fixture 54 between the holding position and the release position. The moving portion 52 is configured to be movable between a first position where the container W held by the third holding portion 53 is positioned directly above the first transfer apparatus 23, a second position where the container W held by the third holding portion 53 is positioned directly above the carry-in region 27C, and a third position where the container W held by the third holding portion 53 is positioned directly above the carry-out region 27D.

The second transfer apparatus 24, by moving the moving portion 52 in the front-rear direction X and moving the third holding portion 53 in the vertical direction Z, moves the container W from the first support portion 33 to the carry-in region 27C, and moves the container W from the carry-out region 27D to the first support portion 33. Specifically, when moving the container W from the first support portion 33 to the carry-in region 27C, first, the moving portion 52 is moved to the first position, and then the third holding portion 53 is lowered and the position of the holding fixture 54 is changed from the release position to the holding position, and then the third holding portion 53 is raised and the flange portion 6 of the container W is held by the third holding portion 53. Next, after the moving portion 52 is moved to the second position, the third holding portion 53 is lowered, the position of the holding fixture 54 is changed from the holding position to the release position, and then the container W is moved to the support region 22. When moving the container W from the carry-out region 27D to the first support portion 33, this can be executed by changing the stopping position of the moving portion 52.

Thus, the second transfer apparatus 24 is configured such that, by switching the position of the holding fixture 54 between the holding position and the release position, it is possible to switch the holding state for the container W to be transferred without horizontally moving the third holding portion 53 with respect to that container W with the moving portion 52. Also, the second transfer apparatus 24 is configured such that it is possible to directly move the container W with respect to both the carry-in region 27C and the carry-out region 27D.

Note that the third holding portion 53 corresponds to a holding portion configured to hold the container W from above. Also, the moving portion 52 corresponds to a horizontal movement mechanism that moves the holding portion in the horizontal direction between the area above the first transfer apparatus 23 and the area above the support region 22.

3. Third Embodiment

Next, a third embodiment of the transport vehicle 2 will be described with reference to FIG. 7. In the present embodiment, the configuration of the transport vehicle 2 is different than the configuration in the first embodiment. Below, the transport vehicle 2 according to the present embodiment will be described with a focus on differences from the first embodiment. Note that points not particularly described here are the same as in the first embodiment.

Figure 7:
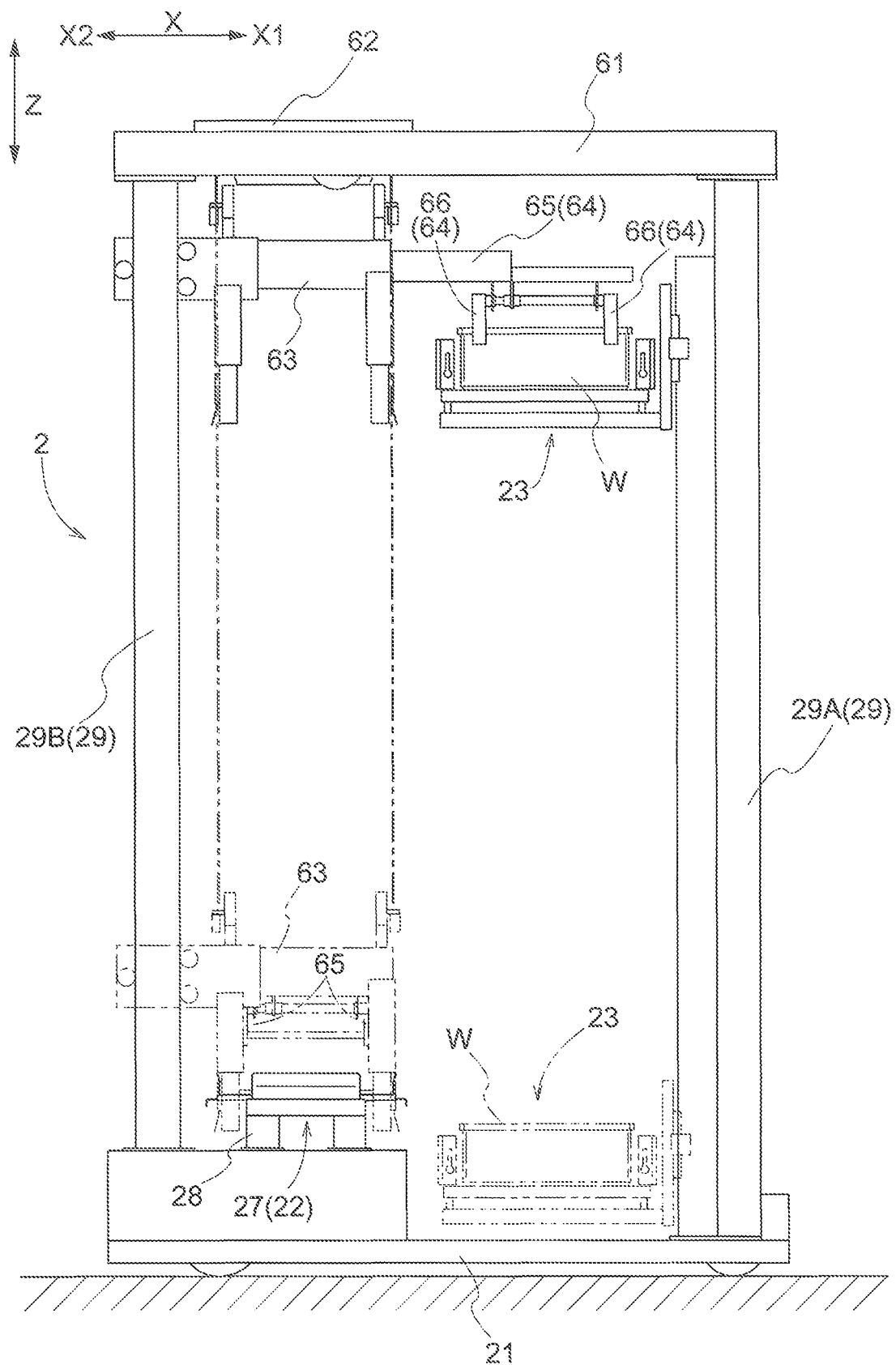
FIG. 7 is a side view of a transport vehicle in a third embodiment.

As shown in FIG. 7, the support region 22 has only one stacking region 27 where a plurality of the containers W in a stacked state can be supported. The support region 22 is provided at a position adjacent to the installation region 25 of the first transfer apparatus 23 in the front-rear second direction X2.

A first mast 29A and a second mast 29B are erected on the traveling unit 21, and the first transfer apparatus 23 moves in the vertical direction Z along the first mast 29A.

The second transfer apparatus 24 is provided with a base 62 fixed to a support frame 61, a third raising/lowering unit 63 that is suspended from and supported by the base 62 and moves in the vertical direction Z along the second mast 29B, and a third transfer unit 64 supported by the third raising/lowering unit 63. The third transfer unit 64 is provided with a third fork portion 65 that can be extended/withdrawn in the front-rear direction X, and a third holding portion 66 that is supported by a tip fork of the third fork portion 65 and moves together with the tip fork. The third holding portion 66 is provided with a holding fixture whose position can be changed between a holding position where the container W is held and a release position where holding of the container W is released, and a drive unit (not shown) that changes the position of the holding fixture between the holding position and the release position.

The third fork portion 65 is configured to be switchable between a withdrawn state withdrawn toward the side of the third raising/lowering unit 63, and a protruding state in which the third fork portion 65 is caused to protrude in the front-rear first direction X1 from the withdrawn state (see FIG. 7). When the third fork portion 65 is set in the protruding state, the container W held by the third holding portion 66 is positioned directly above the first support portion 33, and when the third fork portion 65 is set in the withdrawn state, the container W held by the second holding portion 44 is positioned directly above the support region 22.

The container W is moved between the support region 22 and the first support portion 33 by the movement of the third raising/lowering unit 63 in the vertical direction Z and the extension/withdrawal of the third fork portion 65. Specifically, first, from a state in which the third raising/lowering unit 63 was moved to a position higher than the container W supported by the first support portion 33, the third fork portion 65 is switched to the protruding state, and after lowering the third raising/lowering unit 63 and changing the position of the third holding portion 66 to the holding position, the third raising/lowering unit 63 is raised, and the flange portion 6 of the container W is held by the third holding portion 66. Next, the third fork portion 65 is switched to the withdrawn state, the third raising/lowering unit 63 is lowered and the position of the third holding portion 66 is changed to the release position, and the container W that was supported by the third holding portion 66 is moved to the support region 22.

Note that the third holding portion 66 corresponds to a holding portion configured to hold the container W from above. Also, the third fork portion 65 corresponds to a horizontal movement mechanism that moves the holding portion in the horizontal direction between the area above the first transfer apparatus 23 and the area above the support region 22.

4. Fourth Embodiment

Next, a fourth embodiment of the transport vehicle 2 will be described with reference to FIG. 8. In the present embodiment, the configuration of the transport vehicle 2 is different than the configuration in the first embodiment. Below, the transport vehicle 2 according to the present embodiment will be described with a focus on differences from the first embodiment. Note that points not particularly described here are the same as in the first embodiment.

Figure 8:
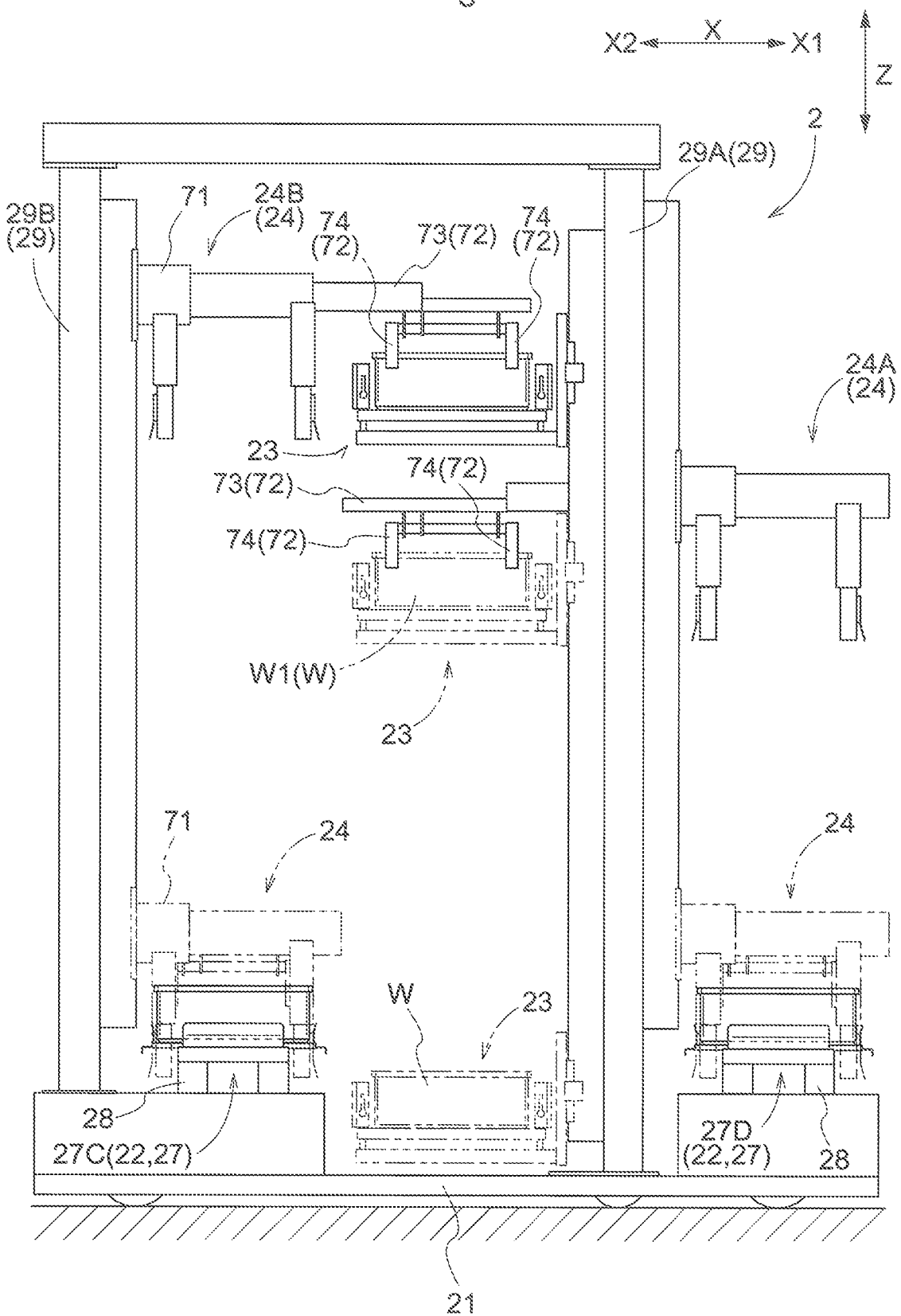
FIG. 8 is a side view of a transport vehicle in a fourth embodiment.

As shown in FIG. 8, the support region 22 is provided at a position adjacent to the installation region 25 of the first transfer apparatus 23 in the horizontal direction. More specifically, the support region 22 has a plurality of the stacking regions 27 where a plurality of the containers W in a stacked state can be supported. Specifically, the plurality of stacking regions 27 included in the support region 22 include the carry-in region 27C where the carry-in containers W1 can be supported, and the carry-out region 27D where the carry-out containers W2 can be supported. Also, the carry-out region 27D is positioned in a state adjacent to the installation region 25 of the first transfer apparatus 23 in the front-rear first direction X1. Also, the carry-in region 27C is positioned in a state adjacent to the installation region 25 of the first transfer apparatus 23 in the front-rear second direction X2. In the present embodiment, both the carry-in containers W1 and the carry-out containers W2 are supported in the support region 22. Therefore, the transport vehicle 2 can execute both carry-in transport and carry-out transport in parallel. That is, this transport vehicle 2 can perform both carry-in transport and carry-out transport in parallel in one instance of back-and-forth movement between the picking unit 3 and the container shelf 1 (see FIG. 1).

The first mast 29A and the second mast 29B are erected on the traveling unit 21, and the first transfer apparatus 23 moves in the vertical direction Z along the first mast 29A.

The transport vehicle 2 is provided with two of the second transfer apparatuses 24, namely a carry-out second transfer apparatus 24A that moves in the vertical direction Z along the first mast 29A, and a carry-in second transfer apparatus 24B that moves in the vertical direction Z along the second mast 29B.

The carry-in second transfer apparatus 24B is provided with a raising/lowering unit 71 that is capable of being raised/lowered along the second mast 29B, and a transfer unit 72 supported by the raising/lowering unit 71. The transfer unit 72 is provided with a fourth fork portion 73 that can be extended/withdrawn in the front-rear direction X, and a fourth holding portion 74 that is supported by a tip fork of the fourth fork portion 73 and moves together with the tip fork. Similar to the carry-in second transfer apparatus 24B, the carry-out second transfer apparatus 24A is provided with a raising/lowering unit 71 and a transfer unit 72. The carry-in second transfer apparatus 24B moves a container W between the first support portion 33 (the first transfer apparatus 23) and the carry-in region 27C by the movement of the raising/lowering unit 71 in the vertical direction Z and extension/withdrawal of the fourth fork portion 73. Also, the carry-out second transfer apparatus 24A moves a container W between the first support portion 33 (the first transfer apparatus 23) and the carry-out region 27D by the movement of the raising/lowering unit 71 in the vertical direction Z and extension/withdrawal of the fourth fork portion 73.

Note that the fourth holding portion 74 corresponds to a holding portion configured to hold the container W from above. Also, the fourth fork portion 73 corresponds to a horizontal movement mechanism that moves the holding portion in the horizontal direction between the area above the first transfer apparatus 23 and the area above the support region 22.

5. Fifth Embodiment

Next, a fifth embodiment of the transport vehicle 2 will be described with reference to FIGS. 9 and 10. In the present embodiment, the configuration of the transport vehicle 2 is different than the configuration in the first embodiment. Below, the transport vehicle 2 according to the present embodiment will be described with a focus on differences from the first embodiment. Note that points not particularly described here are the same as in the first embodiment.

Figure 9:
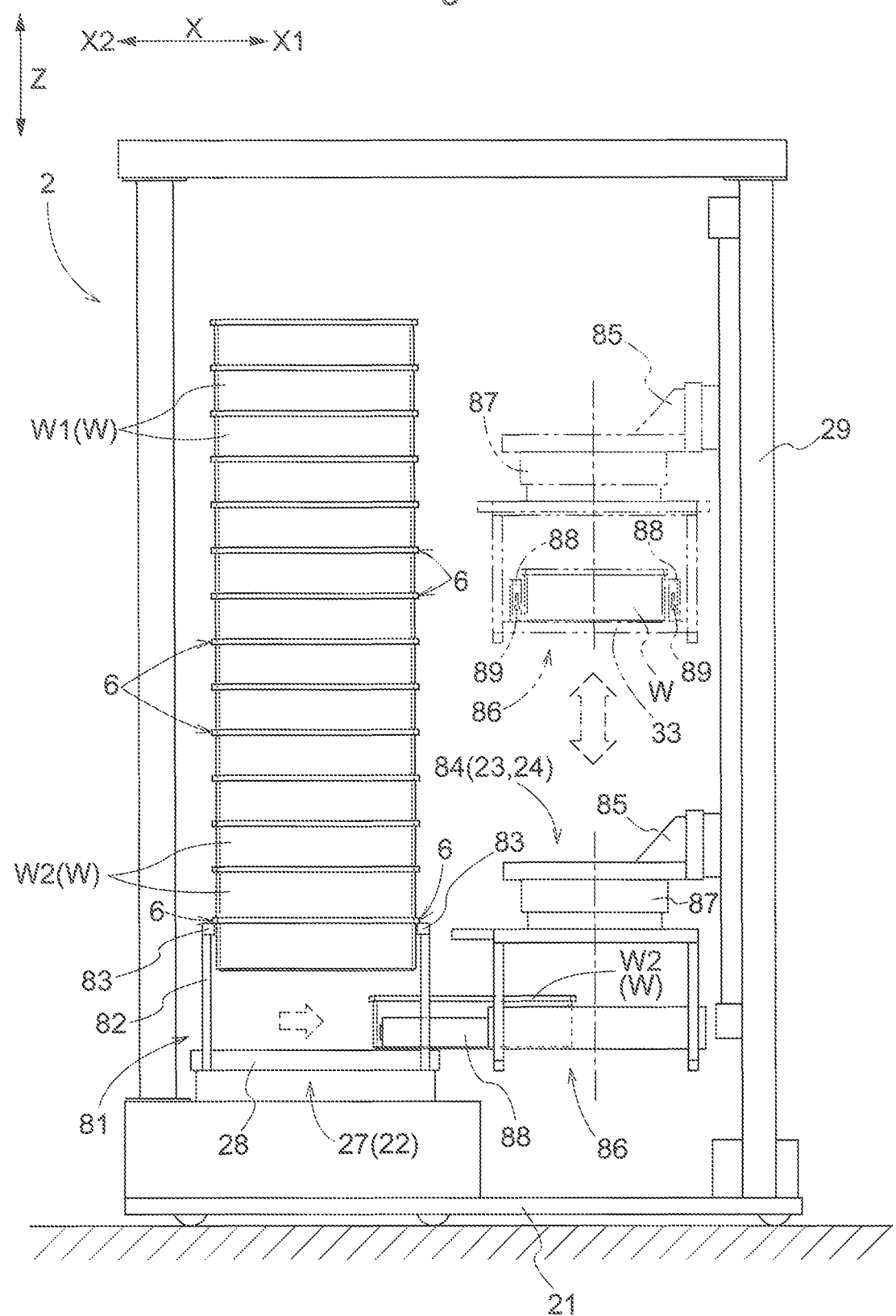
FIG. 9 is a side view of a transport vehicle in a fifth embodiment.
Figure 10:
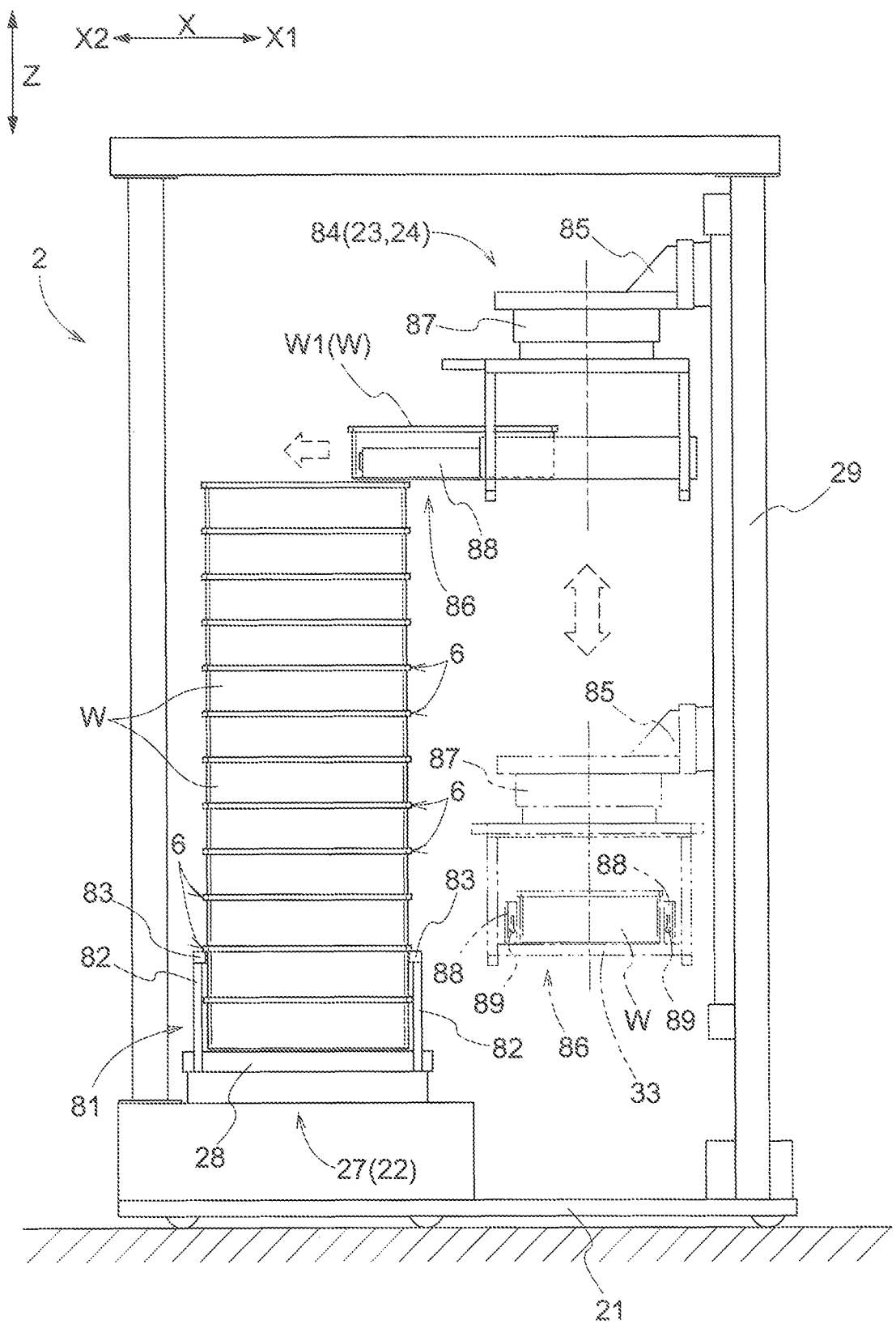
FIG. 10 is a side view of the transport vehicle in the fifth embodiment.

As shown in FIGS. 9 and 10, the support region 22 has only one stacking region 27 where a plurality of the containers W in a stacked state can be supported. The support region 22 is provided with a lifting mechanism 81 that lifts any container W among the containers W stacked in the support region 22 with respect to the containers W below that any container W. In the present embodiment, the lifting mechanism lifts the second container W from the bottom among the containers W stacked in the support region 22 with respect to the first container W from the bottom. The lifting mechanism 81 is provided with a raising/lowering body 82 that moves in the vertical direction Z, and a locking portion 83 provided at the upper end of the raising/lowering body 82. In the present embodiment, both the carry-in containers W1 and the carry-out containers W2 are supported in the support region 22. Therefore, the transport vehicle 2 can execute both carry-in transport and carry-out transport in parallel. That is, this transport vehicle 2 can perform both carry-in transport and carry-out transport in parallel in one instance of back-and-forth movement between the picking unit 3 and the container shelf 1 (see FIG. 1).

The locking portion 83 of the lifting mechanism 81 is configured to be movable between a support position where a part of the locking portion 83 overlaps the flange portion 6 of the containers W stacked in the support region 22 when viewed from the vertical direction Z, and an avoidance position where the locking portion 83 does not overlap the flange portion 6 of the stacked containers W. Also, after moving the raising/lowering body 82 such that the locking portion 83 is positioned between the flange portion 6 of the lowermost container W and the flange portion 6 of the second-lowest container W from the bottom, the flange portion 6 is moved to the support position, and then, by moving the raising/lowering body 82 upward, the second and higher levels among the stacked containers W can be lifted by the lifting mechanism 81.

After the lowermost container W remaining in the support region 22 is moved from the support region 22 by lifting the second and higher levels of the containers W with the transfer apparatus 84 as described above, by then moving the raising/lowering body 82 downward, it is possible to load the second-lowest container W from the bottom as the lowermost container W in the support region 22.

As the first transfer apparatus 23 and the second transfer apparatus 24, the transport vehicle 2 is provided with a transfer apparatus 84 that serves as both the first transfer apparatus 23 and the second transfer apparatus 24. The transfer apparatus 84 is provided with a raising/lowering unit 85 capable of being raised/lowered along the mast 29, a fifth transfer unit 86 supported by the raising/lowering unit 85, and a rotating portion 87 that rotates the fifth transfer unit 86 around a vertical axis in the vertical direction Z. The fifth transfer unit 86 is provided with a fifth fork portion 88, and a hook portion 89 that is supported by a tip fork of the fifth fork portion 88 and moves together with the tip fork.

The fifth fork portion 88 is configured to be switchable between a withdrawn state in which the tip fork is withdrawn toward the side of the raising/lowering unit 85, and a protruding state in which the tip fork is caused to protrude from the withdrawn state. In the second transfer apparatus 24 (the transfer apparatus 84), by rotation of the rotating portion 87, the extended/withdrawn direction of the fifth fork portion 88 can be changed between a state extended/withdrawn in the front-rear direction X (the state indicated by a solid line in FIGS. 9 and 10), and a state extended/withdrawn in the left-right direction Y (the state indicated by a virtual line in FIGS. 9 and 10). In the state where the fifth fork portion 88 is extended/withdrawn in the front-rear direction X, by extending/withdrawing the fifth fork portion 88, it is possible to move a container W between the first support portion 33 and the support region 22. On the other hand, in the state where the fifth fork portion 88 is extended/withdrawn in the left-right direction Y, by extending/withdrawing the fifth fork portion 88, it is possible to move a container W between the first support portion 33 and the container shelf 1, the receiving unit 16, or the discharging unit 18.

Also, in a state where a container W has not been lifted by the lifting mechanism 81, the transfer apparatus 84 stacks a container W (a carry-out container W2) that was removed from a container shelf 1 onto the containers W in a stacked state supported in the support region 22, and also, in a state where the second container W from the bottom has been lifted by the lifting mechanism 81, the transfer apparatus 84 stores the lowermost container W (a carry-in container W1) positioned in the support region 22 on the container shelf 1. Also, in a state where a container W has not been lifted by the lifting mechanism 81, the transfer apparatus 84 stacks a container W (a carry-in container W1) that was discharged from the discharging unit 18 onto the containers W in a stacked state supported in the support region 22, and also, in a state where the second container W from the bottom has been lifted by the lifting mechanism 81, the transfer apparatus 84 moves the lowermost container W (a carry-out container W2) positioned in the support region 22 to the receiving unit 16.

Note that, for example, a configuration may also be adopted in which, in a state where the lowermost container W has been lifted by the lifting mechanism 81, the transfer apparatus 84 moves a container W (a carry-out container W2) that was removed from a container shelf 1 to the support region 22 as the lowermost container W in the support region, and in a state where a container W has not been lifted by the lifting mechanism 81, the transfer apparatus 84 stores the uppermost container W (a carry-in container W1) among the containers W in a stacked state on the container shelf 1, such that the stacking order is exchanged between the carry-in containers W1 and the carry-out containers W2.

6. Other Embodiments

Next, other embodiments of the transport vehicle and the transport facility will be described.

(1) In the above first to fourth embodiments, a configuration is adopted in which the second transfer apparatus 24 moves a container W between the support region 22 and the first support portion 33 of the first transfer apparatus 23, and the container W is directly transferred by the first transfer apparatus 23 and the second transfer apparatus 24. However, a configuration may also be adopted in which the transfer vehicle 2 is provided with the relay region 36 at a location other than the first support portion 33, the transfer apparatus 23 moves the container W between the container shelf 1 and the relay region 36, and the second transfer apparatus 24 moves the container W between the relay region 36 and the support region 22.

(2) In the above fifth embodiment, a configuration is adopted in which the container support portion 28 is not provided with a function to transport stacked containers. However, a configuration may also be adopted in which the container support portion 28 is configured with a conveyor, and is provided with a function to transport a stacked container W. Specifically, a configuration may be adopted in which the container support portion 28 is configured with a conveyor, and in a state in which the transport vehicle 2 has been stopped adjacent to the receiving unit 16 or the discharging unit 18, by operation of the conveyor, a stacked container W is transported from the container support portion 28 to the receiving unit 16 or the discharging unit 18, or a stacked container W is transported from the receiving unit 16 or the discharging unit 18 to the container support portion 28.

(3) In the above embodiments, the control apparatus H virtually sets the travel route R and controls the transport vehicle 2 so as to travel along that travel route R, but a configuration may also be adopted in which a travel rail is installed along the travel route R, and the transport vehicle 2 travels on that travel rail.

(4) In the above embodiments, the container W is a container with an open upper face, but it is sufficient that the container W is stackable, and for example, the container W may be a folding container or the like with a lid attached to the upper face of the container such that the lid can be opened/closed.

(5) It should be noted that the configurations disclosed in each of the above embodiments can be applied in combination with the configurations disclosed in other embodiments as long as no contradiction arises. Regarding those other configurations as well, the embodiments disclosed in the present specification are merely examples in all respects. Accordingly, various modifications can be made as appropriate in a range that does not depart from the gist of the present disclosure.

7. Summary of the Above Embodiments

Following is a summary of the transport vehicle and the transport facility described above.

A transport vehicle travels along a front face of a container shelf provided with a plurality of levels of shelf portions arranged in a vertical direction and configured to support containers, thereby transporting the containers. The containers are configured to be stackable in the vertical direction, and the transport vehicle is provided with a support region where a container is supported, a first transfer apparatus that inserts/takes the container into/out of the container shelf, and a second transfer apparatus that loads/unloads the container on/from the support region. The second transfer apparatus is configured such that a container can be moved to the support region so as to allow a plurality of the containers to be supported in a stacked state in the support region.

According to this configuration, a container that was removed from the container shelf by the first transfer apparatus can be moved to the support region by the second transfer apparatus. Also, a container that was moved from the support region by the second transfer apparatus can be stored on the container shelf by the first transfer apparatus. Also, because the containers are configured to be supported in a stacked state in the support region where the second transfer apparatus loads/unloads the containers, a plurality of the containers can be collectively transported by the transport vehicle. Therefore, it is possible to efficiently transport the containers to the container shelf using this transport vehicle, and to efficiently transport the containers from the container shelf using this transport vehicle.

Also, it is suitable to adopt a configuration in which the second transfer apparatus is provided with a holding portion that holds a container from above, and a horizontal movement mechanism that horizontally moves the holding portion between an area above the first transfer apparatus and an area above the support region, and a container that was moved to the area above the support region by the horizontal movement mechanism is stacked on the top side of a container that is already supported in the support region, whereby a plurality of the containers are supported in a stacked state in the support region.

According to this configuration, the holding portion is moved to the area above the first transfer apparatus by the horizontal movement mechanism and the container that was removed from the container shelf by the first transfer apparatus is held by the holding portion, and then the holding portion is moved to the area above the support region by the horizontal movement mechanism and the container that was being held by the holding portion can be stacked on the top side of the containers being supported in the support region. In this case, it is easy to adopt a configuration in which the container is directly transferred between the first transfer apparatus and the second transfer apparatus, and in such a configuration, furthermore, the container can be smoothly transferred between the first transfer apparatus and the second transfer apparatus.

Also, it is suitable to adopt a configuration in which the second transfer apparatus is configured such that, when holding the container with the holding portion, the holding portion is horizontally moved to a side near that container by the horizontal movement mechanism, and when holding of the container by the holding portion is released, the holding portion is horizontally moved to a side away from that container by the horizontal movement mechanism.

According to this configuration, using the movement of the holding portion by the horizontal movement mechanism, it is possible to hold the container with the holding portion and to release holding of the container by the holding portion, so it is not necessary to provide a dedicated mechanism for releasing holding of the container by the holding portion, and therefore it is possible to simplify the configuration of the second transfer apparatus.

Also, it is suitable to adopt a configuration in which the holding portion is provided with a holding fixture whose position can be changed between a holding position where the container is held and a release position where holding of the container is released, and the second transfer apparatus is configured such that, by switching the position of the holding fixture between the holding position and the release position, it is possible to switch the holding state for the container to be transferred without horizontally moving the holding portion with respect to that container with the horizontal movement mechanism.

According to this configuration, by moving the holding portion in the horizontal direction with the horizontal movement mechanism in a state where the holding portion has been positioned at the release position, it is easy to avoid a situation where the holding portion, which moves in the horizontal direction, makes contact with the container. Also, by changing the position of the holding portion to the holding position in a state where the holding portion has been positioned at a position corresponding to the container, it is possible to hold the container with the holding portion.

Also, it is suitable to adopt a configuration in which the transport vehicle includes a transfer apparatus that serves as both the first transfer apparatus and the second transfer apparatus.

According to this configuration, the transfer apparatus is provided with the function of the first transfer apparatus and the function of the second transfer apparatus, so it is not necessary to transfer the container between the first transfer apparatus and the second transfer apparatus as in the case of a configuration where the first transfer apparatus and the second transfer apparatus are configured separately, and therefore it is possible to smoothly move the container between the container shelf and the support region. Also, the size of the transport vehicle can be more easily reduced than in a case where the first transfer apparatus and the second transfer apparatus are provided as two apparatuses.

Also, it is suitable to adopt a configuration in which the support region is provided at a position adjacent to an installation region of the first transfer apparatus in a horizontal direction.

According to this configuration, it is possible to install the first transfer apparatus near the support region. Therefore, when using the second transfer apparatus to move a container that was removed from a container shelf by the first transfer apparatus to the support region, the movement distance of that container can be shortened and as a result the time needed to move the container with the second transfer apparatus can be shortened.

Also, it is suitable to adopt a configuration in which the support region has a plurality of stacking regions capable of supporting a plurality of the containers in a stacked state.

According to this configuration, it is possible to support containers stacked in each of the plurality of stacking regions, so it is possible to support more containers in the support region than in a case where only one stacking region is provided, and as a result it is possible to further increase the efficiency of transporting the containers with the transport vehicle.

Also, it is suitable to adopt a configuration in which the plurality of stacking regions include a first region where the container can be directly moved by the second transfer apparatus, and a second region where the container cannot be directly moved by the second transfer apparatus, and a transport apparatus that transports a plurality of the containers in a stacked state between the first region and the second region is provided in the support region.

According to this configuration, a container that has been moved to the first region by the second transfer apparatus can be moved to the second region by the transport apparatus. That is, by moving the container to only the first region among the first region and the second region, the second transfer apparatus can directly move the container to the first region, and the second transfer apparatus can indirectly move the container to the second region. Also, because the second transfer apparatus does not need to be provided with a function to move the container to the second region, it is possible to simplify the configuration of the second transfer apparatus.

Also, it is suitable to adopt a configuration in which the plurality of stacking regions include a carry-out region where a container that was removed from the container shelf can be supported, and a carry-in region where a container planned to be stored on the container shelf can be supported, and the second transfer apparatus is configured such that it is possible to directly move the container with respect to both the carry-out region and the carry-in region.

According to this configuration, in a state where a container that was removed from a container shelf is supported in the carry-out region, it is possible to move a container to be stored on a container shelf from the carry-in region using the second transfer apparatus. Also, in a state where a container to be stored on a container shelf is being supported in the carry-in region, it is possible to move a container that was removed from a container shelf to the carry-out region using the second transfer apparatus. In this way, removal of a container from a container shelf and storage of a container on a container shelf can be performed in parallel, so it is possible to further increase the efficiency of transporting the containers with the transport vehicle.

Also, it is suitable to adopt a configuration in which the support region is provided with a lifting mechanism that lifts a container at any height among the containers stacked in the support region with respect to a container below that container.

According to this configuration, using the lifting mechanism, in a state where some stacked containers remain in the support region, it is possible to lift a container at any height among the stacked containers. Therefore, the second transfer apparatus can move a container that remains in the support region from the support region. That is, the second transfer apparatus can load a container on the uppermost stacked container, and can move a container that remains in the support region from the support region. Therefore, for example, the second transfer apparatus can move a container that was removed from a container shelf to the support region, and can move a container to be stored on a container shelf from the support region, or the like, and as a result it is possible to increase the efficiency of transporting the containers with the transport vehicle.

Also, it is suitable to adopt a configuration in which the first transfer apparatus is provided with a support portion configured to support the container and is capable of raising/lowering the support portion, and the first transfer apparatus is configured to, in a state in which the support portion has been raised/lowered to a transfer height corresponding to the shelf portion to receive the transfer, insert/take the container into/out of that shelf portion, and the transfer height corresponding to the lowermost shelf portion is set to a height where the container is supported by the support portion, at a position lower than the container arranged lowermost in the support region.

According to this configuration, the height of the support portion when inserting/taking out a container into/out of the lowermost shelf portion can be set to comparatively low height. Therefore, it is possible to reduce the height of the lowermost shelf portion, and therefore, for example, it is possible to increase the number of levels of shelf portions that are lined up in the vertical direction in a container shelf, and as a result it is possible to increase the container shelf storage efficiency.

A transport facility is provided with a plurality of the transport vehicles. This transport facility includes a plurality of the container shelves, and a control apparatus that sets a travel route of the plurality of transport vehicles. In this configuration, a passageway of the transport vehicles formed between two of the container shelves adjacent in a shelf depth direction serves as an inter-shelf passageway, and the plurality of container shelves are arranged such that a plurality of the inter-shelf passageways are formed. The control apparatus sets a travel route of each of the transport vehicles such that a travel direction of the transport vehicles in each of the inter-shelf passageways is one direction.

According to this configuration, by forming an inter-shelf passageway between two container shelves, a transport vehicle that travels through the inter-shelf passageway is able to insert/take containers into/out of both of the two container shelves that exist on both sides in a direction perpendicular to the travel route. Also, because the travel route is set such the travel direction of the transport vehicle is one direction, it is possible to allow a plurality of the transport vehicles to travel smoothly.

INDUSTRIAL APPLICABILITY

The technology according to the present disclosure is applicable to a transport vehicle that transports a container.

DESCRIPTION OF REFERENCE SIGNS

1: container shelf
2: transport vehicle
11: shelf portion
12: inter-shelf passageway
22: support region
23: first transfer apparatus
24: second transfer apparatus
25: installation region
26: installation region
27: stacking region
27A: first region
27B: second region
43: second fork portion (horizontal movement mechanism)
44: second holding portion (holding portion)
65: third fork portion (horizontal movement mechanism)
66: third holding portion (holding portion)
73: fourth fork portion (horizontal movement mechanism)
74: fourth holding portion (holding portion)
81: lifting mechanism
84: transfer apparatus
H: control apparatus
R: travel route
W: container
Z: vertical direction

The invention claimed is:

1. A transport vehicle that travels along a front face of a container shelf provided with a plurality of levels of shelf portions arranged in a vertical direction and configured to support containers, thereby transporting the containers, the containers configured to be stackable in the vertical direction, and the transport vehicle comprising:
   a support region where a container is supported;
   a first transfer apparatus that inserts/takes the container into/out of the container shelf; and
   a second transfer apparatus that loads/unloads the container on/from the support region;
   wherein the second transfer apparatus is configured such that a container can be moved to the support region so as to allow a plurality of the containers to be supported in a stacked state in the support region,
   wherein the first transfer apparatus and the second transfer apparatus are configured to directly transfer a container therebetween,
   wherein the support region has a plurality of stacking regions capable of supporting a plurality of the containers in a stacked state,
   wherein the plurality of stacking regions include a first region where the container can be directly moved by the second transfer apparatus, and a second region where the container cannot be directly moved by the second transfer apparatus, and
   wherein a transport apparatus that transports a plurality of the containers in a stacked state between the first region and the second region is provided in the support region.

2. The transport vehicle according to claim 1, wherein the second transfer apparatus is provided with a holding portion that holds a container from above, and a horizontal movement mechanism that horizontally moves the holding portion between an area above the first transfer apparatus and an area above the support region, and
   wherein a container that was moved to the area above the support region by the horizontal movement mechanism is stacked on the top side of a container that is already supported in the support region, whereby a plurality of the containers are supported in a stacked state in the support region.

3. The transport vehicle according to claim 2, wherein the second transfer apparatus is configured such that, when holding the container with the holding portion, the holding portion is horizontally moved to a side near that container by the horizontal movement mechanism, and when holding of the container by the holding portion is released, the holding portion is horizontally moved to a side away from that container by the horizontal movement mechanism.

4. The transport vehicle according to claim 2, wherein the holding portion is provided with a holding fixture whose position can be changed between a holding position where the container is held and a release position where holding of the container is released, and
wherein the second transfer apparatus is configured such that, by switching the position of the holding fixture between the holding position and the release position, it is possible to switch the holding state for the container to be transferred without horizontally moving the holding portion with respect to that container with the horizontal movement mechanism.

5. A transport vehicle that travels along a front face of a container shelf provided with a plurality of levels of shelf portions arranged in a vertical direction and configured to support containers, thereby transporting the containers, the containers configured to be stackable in the vertical direction, and the transport vehicle comprising:
a support region where a container is supported;
a first transfer apparatus that inserts/takes the container into/out of the container shelf; and
a second transfer apparatus that loads/unloads the container on/from the support region;
wherein the second transfer apparatus is configured such that a container can be moved to the support region so as to allow a plurality of the containers to be supported in a stacked state in the support region, and
wherein the transport vehicle further comprises a transfer apparatus that serves as both the first transfer apparatus and the second transfer apparatus,
wherein the support region has a plurality of stacking regions capable of supporting a plurality of the containers in a stacked state,
wherein the plurality of stacking regions include a first region where the container can be directly moved by the second transfer apparatus, and a second region where the container cannot be directly moved by the second transfer apparatus, and
wherein a transport apparatus that transports a plurality of the containers in a stacked state between the first region and the second region is provided in the support region.

6. The transport vehicle according to claim 1, wherein the support region is provided at a position adjacent to an installation region of the first transfer apparatus in a horizontal direction.

7. The transport vehicle according to claim 1, wherein the plurality of stacking regions include a carry-out region where a container that was removed from the container shelf can be supported, and a carry-in region where a container planned to be stored on the container shelf can be supported, and
wherein the second transfer apparatus is configured such that it is possible to directly move the container with respect to both the carry-out region and the carry-in region.

8. A transport vehicle that travels along a front face of a container shelf provided with a plurality of levels of shelf portions arranged in a vertical direction and configured to support containers, thereby transporting the containers, the containers configured to be stackable in the vertical direction, and the transport vehicle comprising:
a support region where a container is supported;
a first transfer apparatus that inserts/takes the container into/out of the container shelf; and
a second transfer apparatus that loads/unloads the container on/from the support region;
wherein the second transfer apparatus is configured such that a container can be moved to the support region so as to allow a plurality of the containers to be supported in a stacked state in the support region, and
wherein the support region is provided with a lifting mechanism that lifts a container at any height among the containers stacked in the support region with respect to a container below that container.

9. A transport vehicle according to claim 1, wherein the first transfer apparatus is provided with a support portion configured to support the container and is capable of raising/lowering the support portion, and the first transfer apparatus is configured to, in a state in which the support portion has been raised/lowered to a transfer height corresponding to the shelf portion to receive the transfer, insert/take the container into/out of that shelf portion, and
wherein the transfer height corresponding to the lowermost shelf portion is set to a height where the container is supported by the support portion, at a position lower than the container arranged lowermost in the support region.

10. A transport facility provided with a plurality of the transport vehicles according to claim 1, the transport facility comprising:
a plurality of the container shelves; and
a control apparatus that sets a travel route of the plurality of transport vehicles;
wherein a passageway of the transport vehicles formed between two of the container shelves adjacent in a shelf depth direction serves as an inter-shelf passageway, and the plurality of container shelves are arranged such that a plurality of the inter-shelf passageways are formed, and
wherein the control apparatus sets a travel route of each of the transport vehicles such that a travel direction of the transport vehicles in each of the inter-shelf passageways is one direction.

11. The transport vehicle according to claim 1, wherein the first transfer apparatus is provided with a support portion configured to support a bottom face of the container from below.

12. The transport vehicle according to claim 5, wherein the transfer apparatus is provided with a support portion configured to support the container, a raising/lowering unit capable of being raised/lowered, a transfer unit supported by the raising/lowering unit, and a rotating portion that rotates the transfer unit around a vertical axis in the vertical direction, and
wherein the rotating portion is rotated so that a transfer direction by the transfer unit is changed between a direction in which a container is transferable between the support portion and the support region, and a direction in which a container is transferable between the support portion and the container shelf.

13. The transport vehicle according to claim 5, wherein the support region has a plurality of stacking regions capable of supporting a plurality of the containers in a stacked state.

14. The transport vehicle according to claim 13, wherein the plurality of stacking regions include a first region where the container can be directly moved by the second transfer apparatus, and a second region where the container cannot be directly moved by the second transfer apparatus, and
wherein a transport apparatus that transports a plurality of the containers in a stacked state between the first region and the second region is provided in the support region.

15. The transport vehicle according to claim 13, wherein the plurality of stacking regions include a carry-out region where a container that was removed from the container shelf can be supported, and a carry-in region where a container planned to be stored on the container shelf can be supported, and wherein the second transfer apparatus is configured such that it is possible to directly move the container with respect to both the carry-out region and the carry-in region.

16. The transport vehicle according to claim 8, wherein a lift mechanism is provided with a raising/lowering body that moves in the vertical direction and a locking portion provided at an upper end of the raising/lowering body, and wherein the locking portion is configured to be movable between a support position where a part of the locking portion overlaps the flange portion of the containers stacked in the support region when viewed from the vertical direction, and an avoidance position where the locking portion does not overlap the flange portion of the stacked containers.

17. A transport vehicle according to claim 8, wherein the first transfer apparatus is provided with a support portion configured to support the container and is capable of raising/lowering the support portion, and the first transfer apparatus is configured to, in a state in which the support portion has been raised/lowered to a transfer height corresponding to the shelf portion to receive the transfer, insert/take the container into/out of that shelf portion, and wherein the transfer height corresponding to the lowermost shelf portion is set to a height where the container is supported by the support portion, at a position lower than the container arranged lowermost in the support region.

18. A transport facility provided with a plurality of the transport vehicles according to claim 10, the transport facility comprising:

a plurality of the container shelves; and a control apparatus that sets a travel route of the plurality of transport vehicles;

wherein a passageway of the transport vehicles formed between two of the container shelves adjacent in a shelf depth direction serves as an inter-shelf passageway, and the plurality of container shelves are arranged such that a plurality of the inter-shelf passageways are formed, and wherein the control apparatus sets a travel route of each of the transport vehicles such that a travel direction of the transport vehicles in each of the inter-shelf passageways is one direction.

* * * * *

UNITED STATES PATENT AND TRADEMARK OFFICE
CERTIFICATE OF CORRECTION

PATENT NO. : 11,530,120 B2
APPLICATION NO. : 16/632224
DATED : December 20, 2022
INVENTOR(S) : Yuichi Ueda et al.

It is certified that error appears in the above-identified patent and that said Letters Patent is hereby corrected as shown below:

In the Claims

Column 22, Line 10, Claim 18, delete "claim 10," and insert -- claim 8, --

Signed and Sealed this
Sixth Day of June, 2023

Katherine Kelly Vidal
*Director of the United States Patent and Trademark Office*